United States Patent
Mason et al.

(10) Patent No.: US 6,724,892 B1
(45) Date of Patent: Apr. 20, 2004

(54) HANDSET WITH OBLIQUE KEY FOR ACTUATION BY A USER'S PIVOTING THUMB MOVEMENT

(75) Inventors: Mark Robert Mason, Hempstead (GB); Frank Nuovo, Los Angeles, CA (US); Gregor Daniel Magnusson, Newbury Park, CA (US)

(73) Assignee: Nokia Mobile Phones Limited, Espoo (FI)

( * ) Notice: Subject to any disclaimer, the term of this patent is extended or adjusted under 35 U.S.C. 154(b) by 0 days.

(21) Appl. No.: 08/915,996

(22) Filed: Aug. 21, 1997

(30) Foreign Application Priority Data

Feb. 21, 1997 (GB) ............................... 9703627

(51) Int. Cl.$^7$ ................................ H04M 1/00
(52) U.S. Cl. ......................... 379/433.06; 379/433.01; 379/433.04; 379/433.07
(58) Field of Search ..................... 379/354, 355, 379/59, 58, 428, 368, 433, 428.01, 428.03, 433.01, 433.04, 433.06, 433.07; 455/462; 364/900; 345/145, 404; D14/138, 148, 248

(56) References Cited

U.S. PATENT DOCUMENTS

| 5,073,054 A | * 12/1991 | McDowell | 400/486 |
| 5,332,322 A | 7/1994 | Gambaro | 400/489 |
| D356,562 S | 3/1995 | Nuovo | D14/138 |
| D370,222 S | * 5/1996 | Kajita et al. | D14/138 |
| D374,872 S | * 10/1996 | Scianna et al. | D14/138 |
| 5,633,912 A | * 5/1997 | Tsoi | 455/566 |
| D388,431 S | * 12/1997 | Takayasu et al. | D14/138 |
| D389,142 S | * 1/1998 | Adams et al. | D14/138 |
| 5,715,311 A | * 2/1998 | Sudo et al. | 379/428 |

FOREIGN PATENT DOCUMENTS

| DE | 4204223 A1 | 8/1993 |
| EP | 0 463 856 A2 | 1/1992 |
| EP | 0463856 A2 | 1/1992 |
| EP | 0588210 A1 | 3/1994 |
| EP | 0 588 210 A1 | 3/1994 |
| EP | 0685953 A1 | 12/1995 |
| EP | 0 721 272 A2 | 7/1996 |
| EP | 0721273 A3 | 7/1996 |
| EP | 0463856 B1 | 1/1997 |
| GB | 2 285 195 | 6/1995 |
| GB | 2319691 A | 5/1998 |
| WO | WO-95/25397 A2 | 9/1995 |
| WO | WO-95/25397 A3 | 9/1995 |
| WO | WO-98/37683 A1 | 8/1998 |

OTHER PUBLICATIONS

Nokia Press Releases, titled Nokia Introduces Slim and Stylish Phone to Complement Analog Line, Jan. 09, 1997.*
1. "Interactive Alpha–Numeric Display Interface Architecture" by Rodriguez et al., Motorola Technical Developments, Vol 19, pp. 114–116, Jun. 1993.
UK Patent Office Examination Report dated Jun. 27, 2001.

* cited by examiner

Primary Examiner—Bing Bui
(74) Attorney, Agent, or Firm—Harrington & Smith, LLP

(57) ABSTRACT

A handset is disclosed which comprises a display 3 and a scroll key 9 for scrolling data on the display. The scroll key has two portions which lie on a line oblique to the horizontal. When depressed these portions effect different scrolling actions.

32 Claims, 10 Drawing Sheets

HANDSET WITH OBLIQUE KEY FOR ACTUATION BY A USER'S PIVOTING THUMB MOVEMENT

FIELD OF INVENTION

The present invention relates to a handset having a scrolling function. In particular it relates to a handset having a scroll key.

A handset may be a handheld electronic device, such as a mobile phone, pager or other communications device, or a personal organiser.

BACKGROUND TO INVENTION

FIG. 1 of the accompanying drawings illustrates a mobile phone comprising a scroll key 11. As can be seen the scroll key is positioned in the centre of the phone and has a first element 11a for scrolling in one direction when depressed and a second element 11b, vertically aligned with the first, for scrolling in the opposite direction when depressed.

The position of this key is not ideal for a number of reasons.

Firstly, it is not conducive to the elements being depressed evenly. Depressing of the scroll key 11 at one side could provide an erroneous result, such as no scrolling, or scrolling in the incorrect direction.

Secondly, the key is not readily reached by the user's digits. Hence, the depressing of the elements 11a, 11b can be uncomfortable for the user. This is particularly true when repetitive depression of one of the elements, or movement between the two elements 11a and 11b is required.

BRIEF SUMMARY OF THE INVENTION

According to the present invention there is provided a handset comprising:
  a display for displaying data in a horizontal array; and
  key means for scrolling data on the display;
  the key means having first and second projections which are mutually offset vertically and horizontally; wherein:
  depression of a first portion of the key means actuates the first projection to cause a first scrolling action; and
  depression of a second portion of the key means actuates the second projection to cause a second scrolling action.

The first scrolling action may scroll data in a first direction and the second scrolling action may scroll data in the second direction. The first direction may for example be scrolling vertically and the second scrolling action scrolling horizontally. However, preferably, the first and second directions oppose each other. For example, the first scrolling action scrolls upwards and the second scrolling action scrolls downwards. In this event, depression of the second portion of the key means effects counteraction of the frist scrolling action.

The data may be scrolled gradually, or abruptly.

The scrolling of data gradually generally results in the shifting of data across the screen being visible. For example, a line of text might shift by one row or column on the display. In this event the user might see the leading character of the text disappear from the screen and a new lagging character appear.

When the data is scrolled abruptly, it generally totally replaces the data on the display. For example, text on the display might shift more positions vertically than the number of lines on the display or more positions horizontally than the number of columns of the display.

The data may, for example, be text on the display, a cursor or a visual image. The cursor may be a highlighter, or a line such as an underscore or a vertical line. The cursor may flash to indicate its presence.

The key means may be a single key, or two separate keys. Also, it may be located on different positions on the handset. However, preferably it is adjacent the right hand portion of the display and is inclined so that the slope rises towards the right hand portion of the display.

The key means may provide a variety of functions. For example, it may be used to adjust the volume of ringing tone of a phone or the level of vibration of a battery of a mobile phone or pager.

DETAILED DESCRIPTION OF EMBODIMENTS OF THE INVENTION

Embodiments of the present invention will now be described, by way of example, with reference to the accompanying drawings.

Figure 2:
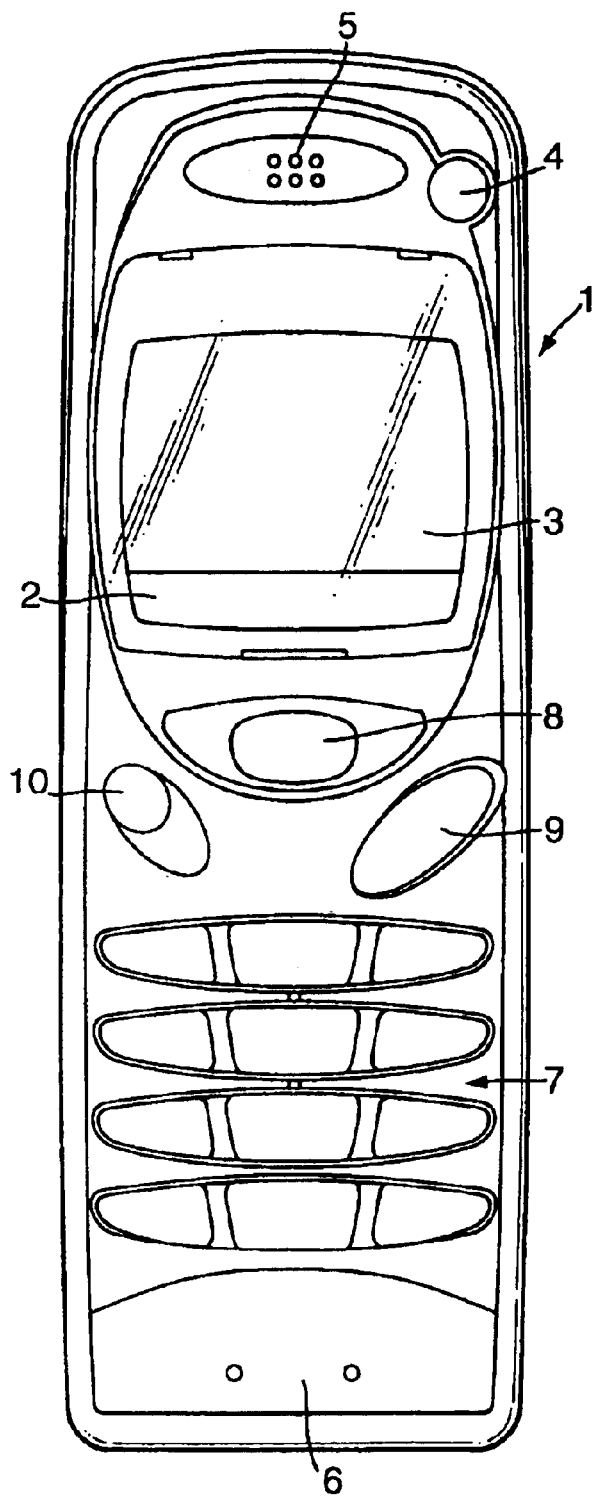
FIG. 2 illustrates a handset having a scroll key according to an embodiment of the present invention.

FIG. 2 shows a handset according to an embodiment of the invention. The telephone comprises a user interface having a keypad, a display 3, an on/off button 4, an earpiece 5, and a microphone 6. The keypad has a first group 7 of keys in the form of alpha-numerical keys, by means of which the user can enter a telephone number, write a text message (SMS), write a name (associated with the telephone number), etc. The user uses the first group of keys primarily for entering data in the telephone (enter events).

The keypad additionally comprises a second group of keys which, in this embodiment, comprises an operation key 8 or soft key whose function depends on the present state of the telephone. The default function or the present function of the operation key 8 is displayed in a predetermined area 2 of the display 3. The second group of keys additionally comprises a scroll key 9 by means of which the user can scroll selectively from one item to the preceding or the succeeding item in the menu loop of the telephone, while he gets access to a submenu loop under the item concerned in the main menu loop by activation of the operation key. The clear key 10 may be used e.g. for erasing the digit or letter entered last by brief depression, while depression of a longer duration will erase the entire number or word. Like the operation key 8, the scroll key 9 and the clear key 10 may advantageously be redefined in some states, which are exemplified in FIG. 7 and its corresponding description.

Figure 1:
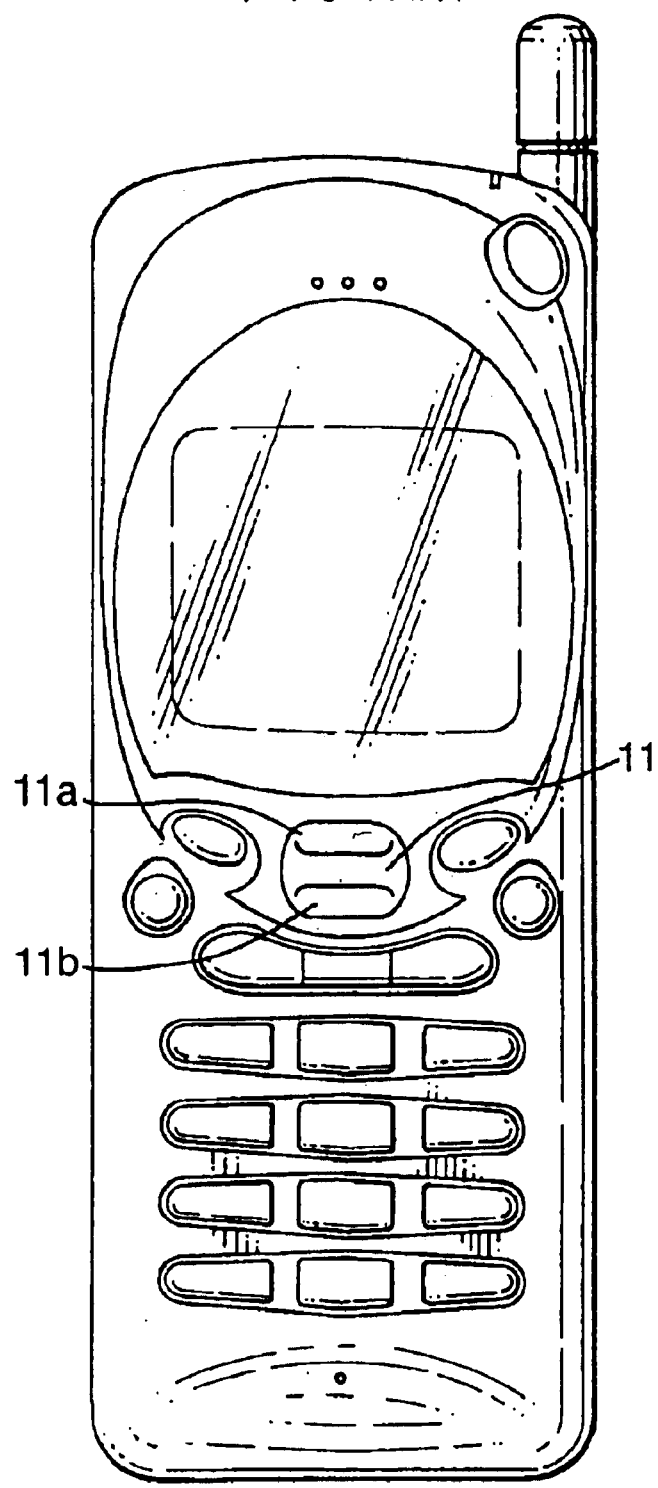
FIG. 1 illustrates a prior art handset having a central vertical scroll key.

The positioning of the scroll key 9 obliquely improves the ergonomics of the handset. Such positioning enables the key to be operated more comfortably by the user. It is particularly agreeable as the two depressible elements of the scroll key are within reach of the user's thumb as it moves naturally across the front face of the phone. No unnatural extension of the thumb along a vertical axis is required, as in the prior art shown in FIG. 1. Also, the depression of these elements of the scroll key 9 only requires movement of the thumb from its socket and does not require any other hand movement. Hence, the handset can be held and the scroll key readily operated using the same hand.

Figure 12:
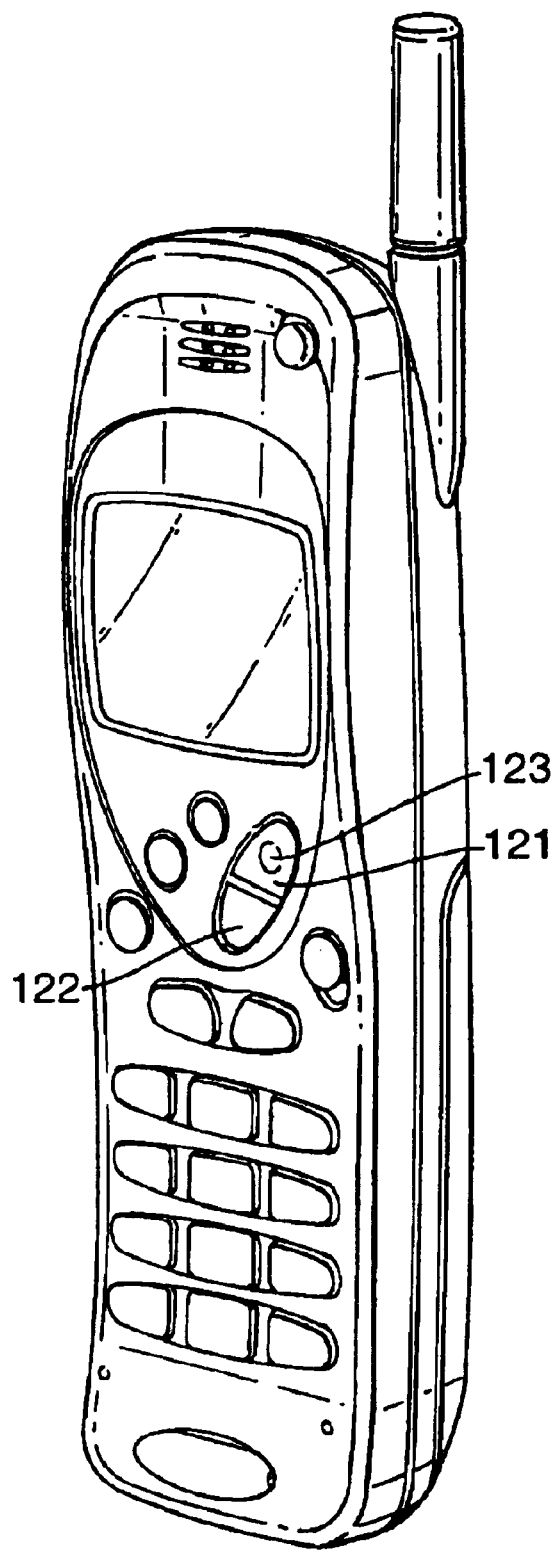
FIG. 12 illustrates a handset having an alternative scroll key to that shown in FIG. 2.

FIG. 12 illustrates a handset according to an embodiment of the invention, which has an alternative scroll key 121 to that shown in FIG. 2. This scroll key 121 is different from scroll key 9 of FIG. 2 in that it is sloped at a different angle. Also, the scroll key 121 of FIG. 12 consists of two keys 122 and 123 for enabling the scrolling actions, whereas the scroll key 9 of FIG. 2 is a single key.

Figure 13:
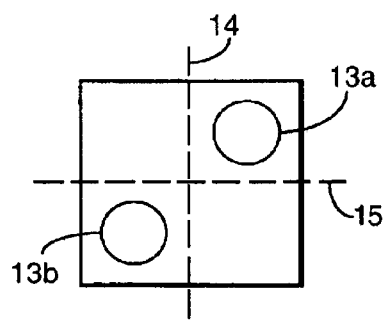
FIG. 13 illustrates the hidden side of a scroll key according to an embodiment of the present invention.

FIG. 13 illustrates projections 13*a*, 13*b* of a scroll key on its backside, which actuate respective scrolling actions. The projections may have conductive tips, which directly make or break electrical contact with contacts on the handset's PCB to enable depression of an associated portion of the scroll key to be registered. Registering of the depression of one of the portions by a microprocessor of the handset results in an associated scroll action being effected.

Figure 14A:
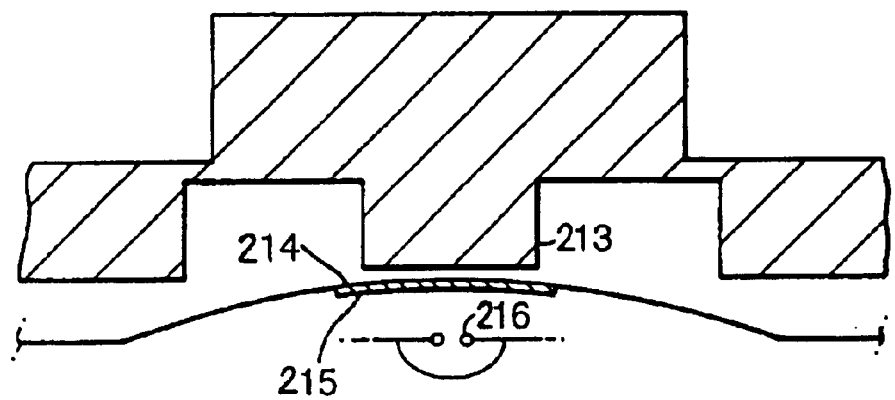
FIG. 14 illustrates an example of a scroll key arrangement.
Figure 14B:
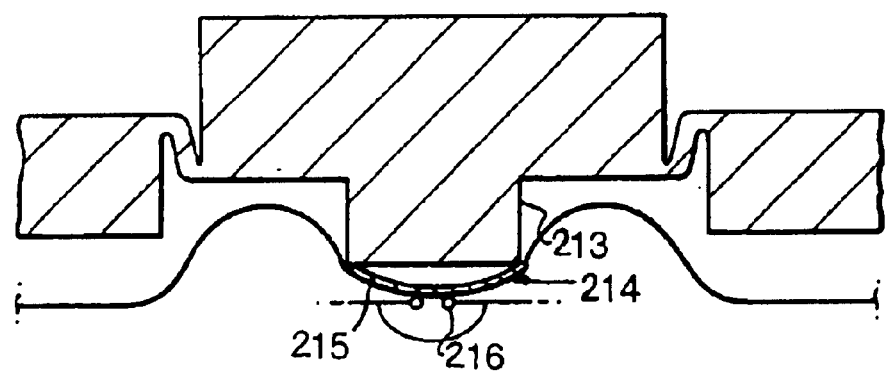

An alternative arrangement is shown in FIG. 14. In this arrangement, the projections 213 act on a respective dome 214, which has a conductive portion 215 facing a contact 216 on the PCB. In such an arrangement, the depression of a portion of the scroll key causes movement of the associated projection 213 until it contacts the dome 214. This causes the dome to invert, thus bringing its conductive surface 214 into contact with an associated contact 216 of the PCB, so making electrical contact. Accordingly, the corresponding scroll action is enabled. (FIG. 14*b*).

Release of the portion of the scroll key causes the dome 214 to return to its original position, thus breaking the electrical contact. (FIG. 14*a*).

The projections 13*a*, 13*b* of the scroll key according to the present invention are vertically and horizontally offset, as is exemplified in FIG. 13.

As can be seen from this figure, the projections are vertically offset: they are on completely opposite sides of a vertical axis 14. Also, they are horizontally offset: they are on completely opposite sides of a horizontal axis 15.

A line intersecting the two projections may be at an angle of 20–70 degrees from the horizontal. More specifically, it may be at an angle of 30–60 degrees from the horizontal. Preferably, it is around 45 degrees from the horizontal.

In such cases, for example, the projections lie on an arc which follows the pivotal movement of the thumb about its socket when it naturally sweeps across the face of the handset. Hence, there is no strain on the thumb to reach the requisite portions of the scroll key to depress the projections.

FIGS. 2 and 12 show the scroll key on the right hand side of the phone. However, they may be placed, for example on the left, or in the centre. It is easier for right hand users in particular to reach the scroll keys if it is on the right hand side of the phone. In this instance, it is preferable if one of the projections 13*a* is completely above a horizontal axis 15 and to the right of a vertical axis 14 and the other projection is below the horizontal axis 15 and to the left of the vertical axis 14, as shown in FIG. 13. If, alternatively, the key is on the left hand side of the phone, it is preferable if one projection is completely above a horizontal axis and to the left of a vertical axis and the other projection is below the horizontal axis and to the right of the vertical axis. If the key is in the centre of the phone, it could be either way round.

The scroll key may comprise a raised portion on its visible surface, above either or both of the projections, as shown by reference 123 in FIG. 12. Such raised portions assist to indicate which portions of the key to depress to achieve a scrolling action.

FIG. 3 illustrates cursors which may be scrolled on the display using the scroll key.

Figure 3A:
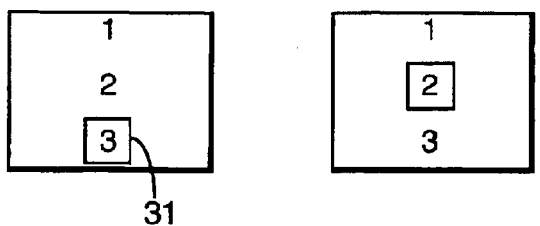
FIGS. 3a–3c illustrate the scrolling of cursors.

FIG. 3*a* shows a cursor 31 which highlights an individual character of the data on the display. In this example, one portion of the scroll key is depressed to cause the cursor to scroll one position up the display. If the other portion of the scroll key is subsequently depressed, the cursor 31 would move back from highlighting numeral 2 to numeral 3.

Figure 3B:
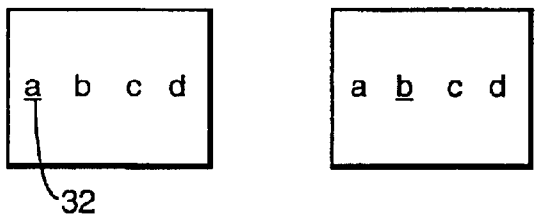

FIG. 3*b* shows a cursor which is a line 32, in this case an underscore. It underscores a single character. In this example, one portion of the scroll key is depressed to cause the cursor to scroll one position to the left of the display. Depression of the other portion of the scroll key would cause the cursor to scroll one position to the right of the display, thus underscoring the letter "a" again.

Figure 3C:
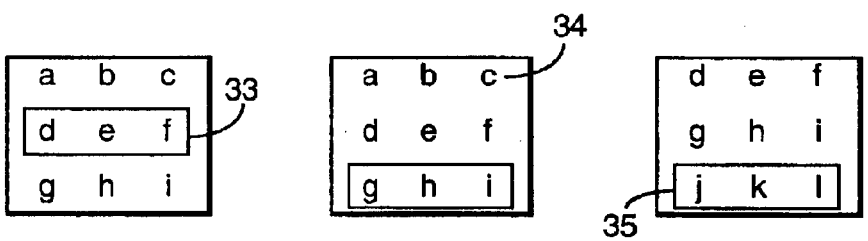

FIG. 3*c* shows a cursor 33 which highlights a horizontal array of data, such as a row of text. Such a highlighter can, for example, be used to highlight one option from several rows of options of a menu. The highlighted option can then subsequently be selected. In the example illustrated, the portion of scroll key depressed causes the cursor to move down the display until it reaches the bottom line. Continued depression of that portion of the scroll key then causes text to move in the opposite direction so that the next row 35 of text is highlighted on the bottom line of the display and the original top row 34 of text is scrolled off the display.

Each depression of one of the portions of the scroll key may scroll the highlighter 34 or text by one row. Alternatively, the highlighter or text may continue being scrolled for the duration that the portion of the key is being depressed.

Figure 4:
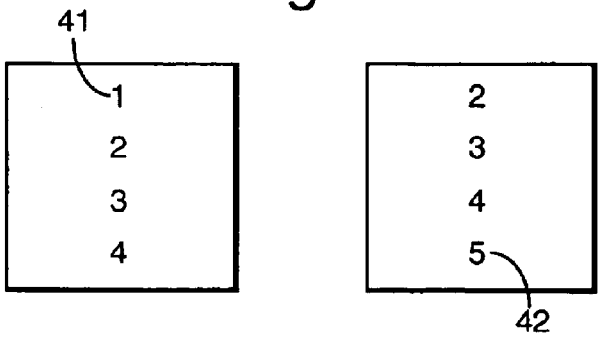
FIG. 4 illustrates the upward scrolling of text across the display.

FIG. 4 illustrates an example of gradual scrolling of the text. In this case, the scrolling action is performed one line at a time. As one of the portions of the scroll key is depressed, it causes scrolling of the text up the display by one line, so that the original top line 41 disappears from the display and a new bottom line 42 appears.

Figure 5:
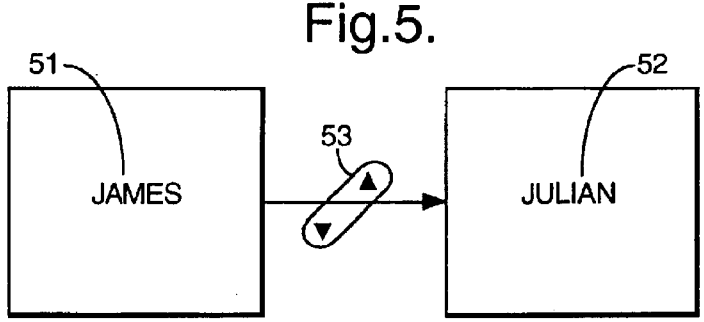
FIG. 5 illustrates scrolling through a phone book.

FIG. 5 illustrates the use of scrolling key 53 to scroll through a phone book of a mobile phone, for example. In this case, each scrolling action causes a new name/phone number 52 to be scrolled on the display which totally replaces the previous name/phone number 51.

Figure 6:
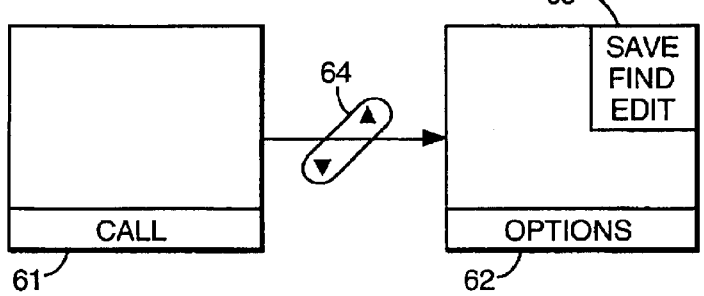
FIG. 6 illustrates scrolling through menu options.

FIG. 6 illustrates the use of a scroll key 64 to scroll data abruptly. In this case the key 64 scrolls a new menu on the display which completely replaces the previous one. This is further exemplified below with references to FIGS. 8 and 11 of the accompanying drawings.

Figure 7:
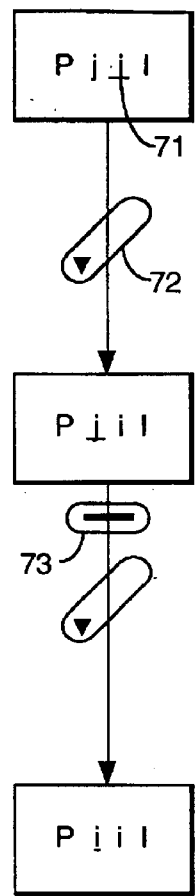
FIG. 7 illustrates scrolling a cursor on a display and providing an editing function.

FIG. 7 illustrates the use of scroll key 72 in an editing function. The key is firstly used to move the cursor to the character to be amended. Then its function is changed by depressing a soft key 73. The scroll key is then used to scroll characters on the display until the correct character appears.

Other uses of the scroll key including adjusting the volume of ringing tone on a phone and the level of vibration of the battery.

Figure 9:
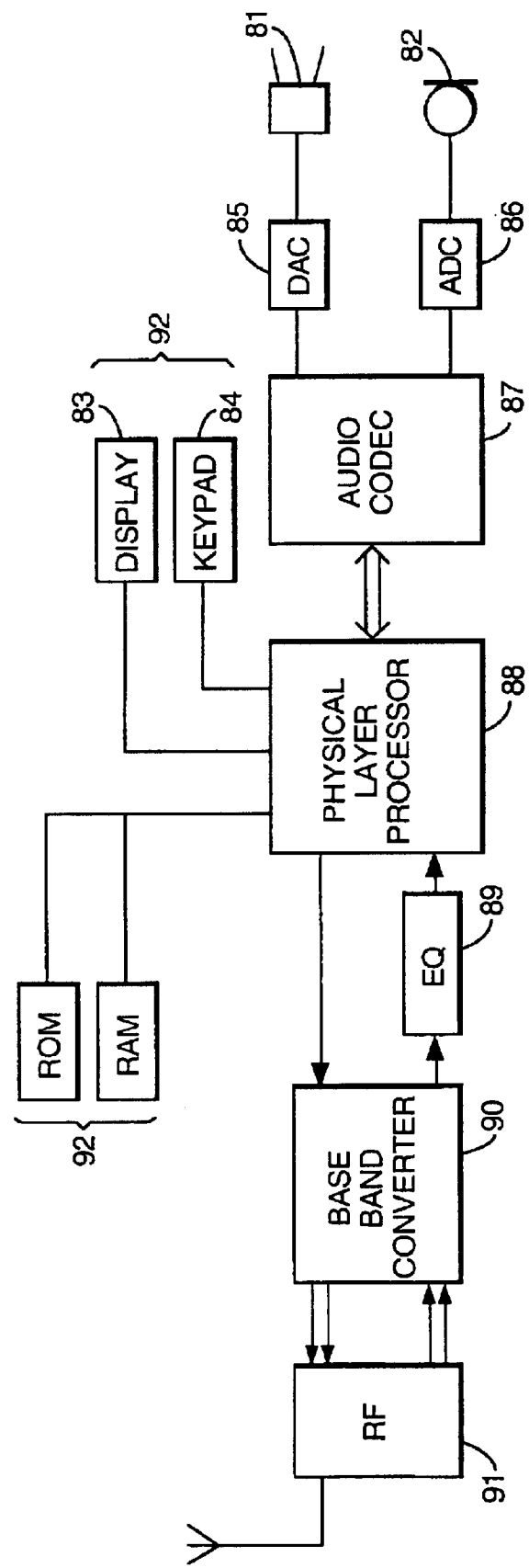
FIG. 9 is a block diagram of typical hardware of a mobile telephone.

A preferred embodiment of the invention will now be described in which the scroll key 9 is used in connection with a single soft key 8 in a mobile phone. To assist in its understanding a brief outline of typical hardware in a mobile phone will firstly be described with reference to FIG. 9.

The telephone of the invention may be used in connection with the GSM network in particular, but, may also be applied in connection with other telephone networks, such as cellular networks and various forms of cordless telephone systems. The microphone 82 records the user's speech, and the analog signals formed thereby are A/D converted in an A/D converter 86 before the speech is encoded in an audio codec unit 87. The encoded speech signal is transferred to a physical layer processor 88, which, for example, supports the GSM terminal software. The processor 88 also forms the interface to the peripheral units 92 of the apparatus, including the display 83 and the keypad 84 (as well as SIM, data, power supply, RAM, ROM, etc.). The processor 88 communicates with the RF part 91 via a baseband converter 90 and a channel equalizer 89. The audio codec unit 87 speech-decodes the signal, which is transferred from the processor 88 to an earpiece 81 via a D/A converter 85. The units 85–91 are usually integrated in a chip set, an example of such a commercially available chip set being AD20msp410 GSM from Analog Devices with associated protocol software from The Technology Partnership (TTP).

The processor 88, which serves as the controller unit in a manner known per se is connected to the user interface. Thus, it is the processor which monitors the activity in the telephone and controls the display 83 in response thereto. Therefore, it is the processor 88 which detects the occurrence of a state change event and changes the state of the telephone and thus the display text. A state change event may be caused by the user when he activates the keypad, which is called an entry event, and also by the network connection of the telephone or by another event beyond the user's control, which is called a non user event. Non user events comprise status change during call set-up, change in battery voltage, change in antenna conditions, message on reception of SMS, etc.

Figure 8:
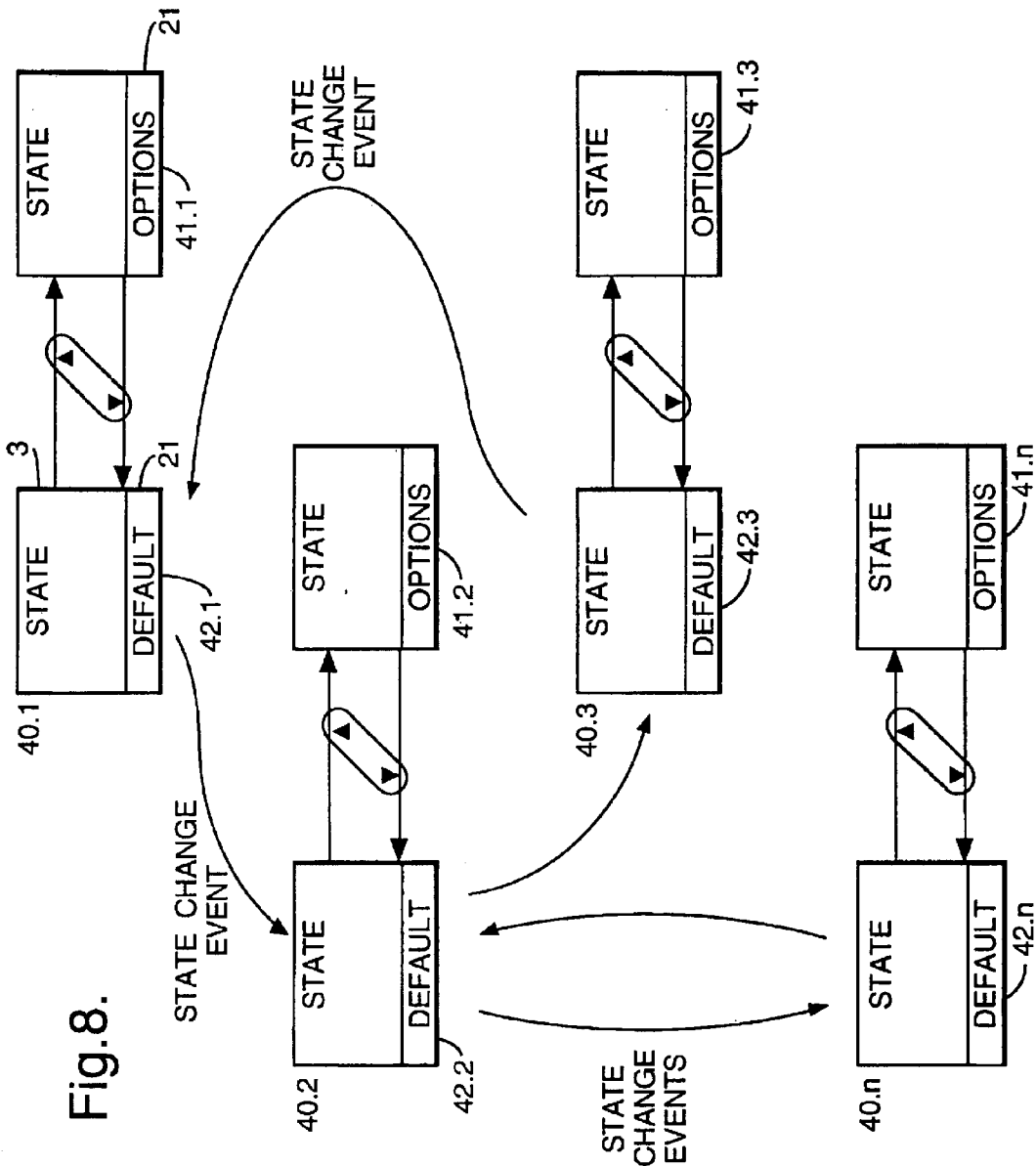
FIG. 8 illustrates scrolling a new menu on the display.

The use of a single soft key is based on the idea that the telephone can assume a plurality of predetermined states 40.1–40.n, which is illustrated in FIG. 8. A plurality of actions (options 41.1–41.n) may be performed in these states 40.1–40.n. The display image at arrival to state 40.1 may be a telephone number or the name of a person contained in the phonebook of the telephone, which is indicated by "state". "State" might also cover "incoming calls", "E-mail received", "SMS received", etc. If the display contains a telephone number, the default function 42.1–42.n might be "call". The scroll key 9 allows scrolling from the default function to the group of possible functions, to which the default function belongs. In this preferred embodiment, the scroll key 9 scrolls between the default function and the group of possible functions (options), but switches to scrolling between items in the group of possible functions, once this group has been selected by means of the operation key. The state is maintained during such operations.

As can be seen from FIG. 8, a state change event will result in a change from one state to another. The new state depends on the old state and the nature of the state change event. During an established call ("call established" state), the default function of the operation key 8 will according to the preferred embodiment be "end". If a new incoming call "is waiting", the user may use the scroll key 9 to scroll the option list including items such as "end", "join", "answer" and "swap" onto the display without interrupting the call.

Each state 40.1–40.n is associated with a predefined group of functions, actions or options 41.1–41.n, which are possible precisely for that state. Establishment of conference calls, e.g., can be performed only when a call has already been established. A preferred function serving as the default function 42.1–42.n is designated in each of these groups. This designation may be performed by the programmer during programming, by the user through his redefinition of the default function, or by the telephone itself in that it records the frequency of the use of the individual functions and appoints the most frequently used one in each group as the default function—optionally with the user's acceptance.

When the telephone changes its state, the operation key can perform the default function if it is activated, and the user may scroll between the default function and the whole group of options by means of the scroll key. If the group of options is selected with the operation key, the user will be able to scroll through the group of options with the scroll key and to select the desired (designated) function with the operation key.

When a function is selected with the operation key, the processor 88 runs the associated program sequence to execute the function.

Figure 10:
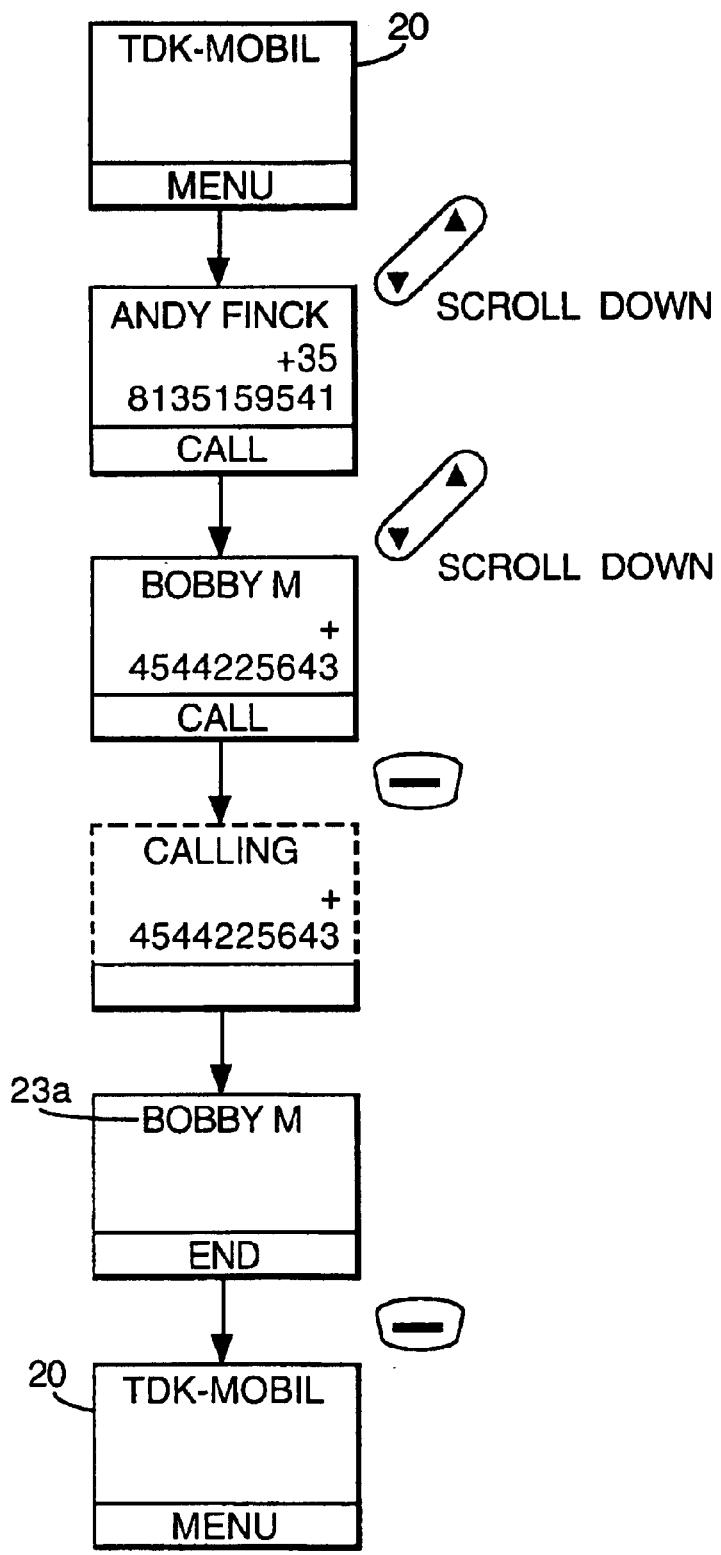
FIG. 10 illustrates the selection of a phone number from a phone book according to an embodiment of the invention.

FIG. 10 shows the role of the scroll key 9 to select a phone number from an address book according to a preferred embodiment of the invention.

The display text is simultaneously indicated with the keys of the keypad which have been activated. The display 3 has a display image 20 ("idle mode" state) which shows the function of the soft key 8 as a highlighted bar in a predetermined area (soft key display) 21 of the display. The function of the soft key 8 in the idle mode in this embodiment is to gain access to the main menu loop of the telephone. The upper part of the display 20 shows an identification of the network operator concerned (here TDK-MOBIL). The display may additionally contain an indicator of the antenna signal strength and a battery voltage indicator. These are not shown in the figures, as they have no importance to the description of the default function.

When the soft key 8 is activated establishment of a call is attempted, which causes the telephone to change to a "call established state" under the control of the processor 88, and the new function "end" of the operation key 8 is now displayed in the soft key display 21. It is shown at the same time in the display that it is attempted to establish a call, which is done by the indication "calling . . . ". The number to which the connection is to be established is still displayed in the main area 23 of the display.

The scroll key 9 is used at the idle mode display image 20 stage to gain access to the phonebook of the telephone under the main menu loop. This causes the telephone number and the name code of the first storage location in the phonebook to be displayed in the display. The telephone changes to the "number handling state", and the new default function "call"

of the soft key 8 is now displayed in the soft key display 2. By continued use of the scroll key 9 the user will be able to scroll through the phonebook until he finds the number he wants. As the soft key 8 maintains its "call" function as the default function, the call can still be established by depression of the soft key 8. Then, the call can be established and terminated as follows.

When the call has been established, this can be indicated by displaying "connected" at the top of the display and by an indication of the telephone by means of which the call has been established. The identification in this instance is a name code 23*a*. The default function of the soft key 8 will still be "end", which is shown in the soft key display 2. If the soft key 8 is activated once more, the call will be interrupted, and the telephone will return to the "idle mode state" with the idle mode display image 20.

Figure 11:
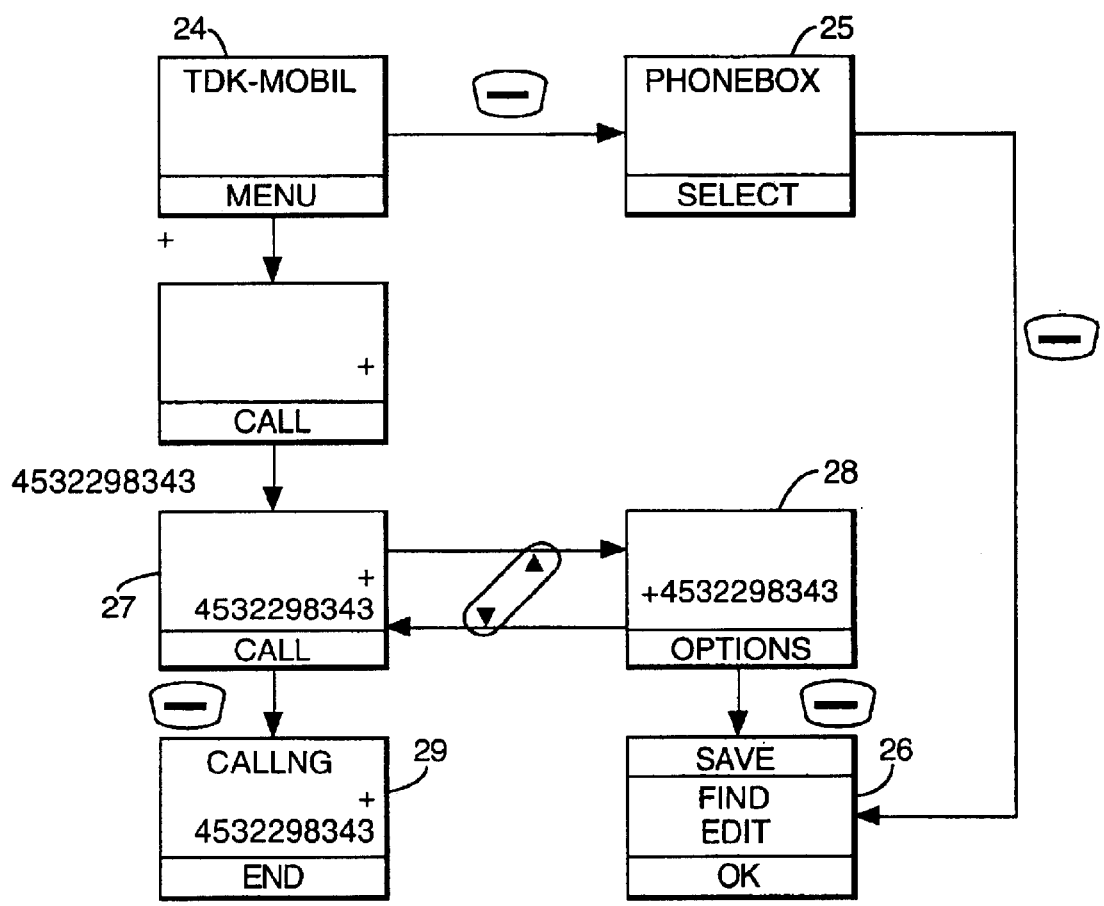
FIG. 11 illustrates scrolling an alternative menu on the display according to an embodiment of the present invention.

FIG. 11 shows the use of the scroll key 9 to scroll an alternative menu onto the display.

The "idle mode state" with the display image 20 (idle mode display) can be changed to a main menu by activating the soft key 8. Here, access to the phonebook is presented as default. If the user selects this, he may choose between the individual submenu items in the phonebook shown on the display by image 26. If, alternatively whilst in the "idle mode state", the user had instead begun to enter a telephone number, the telephone would have changed to a "number handling state" with a display image 27 with "call" as the default function. The user may in this case switch to possible functions in this state (display image 28) by scrolling such functions on the display using the scroll key 9. These functions comprise the submenu items (display image 26) of the phonebook, and the requisite one may be selected by scrolling the cursor to highlight it and then pressing the soft key 8. If, instead, the user had selected the default function in the "number handling state", the telephone would have started establishment of a call (display image 29).

Although it is shown in the preferred embodiment that the functions of the telephone might very well be controlled by a single operation key, it may be found expedient in some cases to use two or more operation keys in the second group of keys, optionally integrated in a touch-sensitive display.

In view of the foregoing description it will be evident to a person skilled in the art that various modifications may be made within the scope of the claims.

What is claimed is:

1. A handset comprising:

a display for displaying data; and key means for scrolling data on the display;

the key means having first and second projections which are mutually offset vertically and horizontally;

wherein:

depression of a first portion of the key means actuates the first projection to cause a first scrolling action; and depression of a second portion of the key means actuates the second projection to cause a second scrolling action, wherein the first projection is to the right of the second projection and closer to the top of the handset such that a user holding the handset in a right hand can depress the first and second portions with a thumb of the right hand by merely pivotally moving the thumb in an arc about a socket of the thumb and without significant unnatural extension of the thumb.

2. A handset as claimed in claim 1, wherein the first scrolling action is scrolling data in a first direction.

3. A handset as claimed in claim 2, wherein the second scrolling action is scrolling data in a second direction.

4. A handset as claimed in claim 3, wherein the second direction is opposite to the first.

5. A handset as claimed in claim 2, wherein the data is scrolled gradually.

6. A handset as claimed in claim 5, wherein the first scrolling action is shifting the data by one position on the display in the first direction.

7. A handset as claimed in claim 5, wherein the data comprises text.

8. A handset as claimed in claim 7, wherein scrolling of the data causes the leading character to disappear from the display and for a new lagging character to appear.

9. A handset as claimed in claim 1, wherein the data is scrolled abruptly.

10. A handset as in claimed in claim 9, wherein the first scrolling action is replacing data on the display with new data.

11. A handset as claimed in claim 10, wherein the new data is a menu option.

12. A handset as claimed in claim 10, which provides a phone book function, wherein the first scrolling action replaces a first phone number on the display with a second phone number.

13. A handset as claimed in claim 1, wherein the data comprises a cursor.

14. A handset as claimed in claim 13, wherein the cursor is a highlighter.

15. A handset as claimed in claim 14, wherein the cursor is a line.

16. A handset as claimed in claim 1, wherein the key means is a single key.

17. A handset as claimed in claim 1, wherein the key means is adjacent the right hand portion of the display.

18. A handset as claimed in claim 1, wherein the key means adjusts the volume of ringing tone.

19. A handset as in claim 1 wherein a line intersecting the first and second projections is at an angle of between about 20–70 degrees from horizontal.

20. A handset as claimed in claim 1 wherein the display is adapted to display the data in a horizontal array.

21. A handset as claimed in claim 1 wherein the key means comprises a single key.

22. A handset as claimed in claim 1 wherein the key means comprises two keys.

23. A handset as claimed in claim 22 wherein a first one of the keys comprises a raised portion on a visible surface of the first key.

24. A handset as claimed in claim 22 wherein a first one of the keys is located at a top and first oblique end of the key means and a second one of the keys is located at an opposite bottom and second oblique end of the key means.

25. A telephone handset comprising:

a housing;

a display connected to the housing; and a rocker key connected to the housing for displaying data on the display, the key being obliquely positioned on the housing with a top section located closer to a lateral proximate side of the housing than a bottom section of the key such that a user holding the handset in a hand can alternatively depress the top and bottom sections with a thumb of the hand by merely pivotally moving the thumb in an arc about a socket of the thumb and without significant unnatural extension of the thumb.

26. A handset as in claim 25 wherein the angle is between about 30–60 degrees from horizontal.

27. A handset as in claim 26 wherein the angle is about 45 degrees from horizontal.

28. A handset as in claim 25 wherein the lateral proximate side is the right side, and wherein the key is obliquely positioned on the housing with the top section located closer to the right side of the housing than the bottom section of the key such that the user holding the handset in a right hand can depress the top and bottom sections with a thumb of the right hand.

29. A telephone handset comprising a display for displaying data; and key means for scrolling data on the display;

the key means having first and second projections which are mutually offset vertically and horizontally;

wherein:

depression of a first portion of the key means actuates the first projection to cause a first scrolling action; and depression of a second portion of the key means actuates the second projection to cause a second scrolling action, wherein the first projection is laterally offset relative to the second projection and closer to the top of the handset such that a user holding the handset can depress the first and second portions with a thumb of the hand by merely pivotally moving the thumb in an arc about a socket of the thumb and without significant unnatural extension of the thumb.

30. A handset as in claim 29 wherein the first projection is laterally offset to the right side relative to the second projection and closer to the top of the handset such that the user holding the handset can depress the first and second portions with a thumb of the user's right hand.

31. A telephone handset comprising a housing;

a display connected to the housing for displaying data; and a rocker scroll key for scrolling data on the display, wherein the rocker scroll key comprises first and second projections which are mutually offset vertically and horizontally, wherein the rocker scroll key is coupled to the display and is adapted such that depression of a first portion of the scroll key actuates the first projection to cause a first scrolling action of the data on the display, and depression of a second portion of the scroll key actuates the second projection to cause a second scrolling action, wherein the scroll key is sized, shaped and located on the housing with the first projection laterally offset relative to the second projection and closer to a top of the housing such that a user holding the handset can alternatively depress the first and second portions with a thumb of a same hand by merely pivotally moving the thumb in an arc about a socket of the thumb and without significant unnatural extension of the thumb.

32. A telephone handset as in claim 31 wherein the rocker scroll key has a rocking motion which is substantially limited to an oblique rocking motion relative to horizontal and vertical axes on the housing.

* * * * *